United States Patent
Kim et al.

(10) Patent No.: US 6,577,478 B2
(45) Date of Patent: *Jun. 10, 2003

(54) OVERLOAD CIRCUIT INTERRUPTER CAPABLE OF ELECTRICAL TRIPPING AND CIRCUIT BREAKER WITH THE SAME

(75) Inventors: Cheon-Youn Kim, 103-1102 Daewoo 2 cha APT., 925-7 Dongchun-dong, Yeonsu-gu, 406-130 Incheon (KR); Jeong-Wan Kim, Gyeonggi-do (KR); Gi-Jong Ban, Gyeonggi-do (KR); Dong-Sub Kim, Gyeongsangbuk-do (KR)

(73) Assignees: Human El-Tech, Inc., Seoul (KR); Cheon-Youn Kim, Incheon (KR)

( * ) Notice: Subject to any disclaimer, the term of this patent is extended or adjusted under 35 U.S.C. 154(b) by 0 days.

(21) Appl. No.: 09/908,532

(22) Filed: Jul. 19, 2001

(65) Prior Publication Data

US 2002/0024782 A1 Feb. 28, 2002

(30) Foreign Application Priority Data

Aug. 22, 2000 (KR) .......................................... 2000-48580
Apr. 25, 2001 (KR) .......................................... 2001-22392
Jun. 26, 2001 (KR) .......................................... 2001-36744

(51) Int. Cl.$^7$ .................................................. H02H 3/00
(52) U.S. Cl. ........................................... 361/42; 361/78
(58) Field of Search .................... 361/42, 93.9, 101, 361/111, 115, 62, 78, 86

(56) References Cited

U.S. PATENT DOCUMENTS

| | | |
|---|---|---|
| 3,962,606 A | 6/1976 | Burns et al. |
| 4,027,203 A | 5/1977 | Moran et al. |
| 4,351,013 A | 9/1982 | Matsko et al. |
| 4,425,596 A | 1/1984 | Satou |
| 5,502,611 A | 3/1996 | Rodgers |
| 5,682,101 A | 10/1997 | Brooks et al. |
| 5,805,397 A | 9/1998 | MacKenzie |
| 5,886,861 A | 3/1999 | Parry |
| 5,933,305 A | 8/1999 | Schmalz et al. |
| 5,963,406 A | 10/1999 | Neiger et al. |
| 6,057,997 A | 5/2000 | MacKenzie et al. |
| 6,339,525 B1 * | 1/2002 | Neiger et al. .................. 361/42 |

* cited by examiner

Primary Examiner—Shawn Riley
(74) Attorney, Agent, or Firm—Rabin & Berdo, P.C.

(57) ABSTRACT

An overload circuit interrupter (OLCI), and a circuit breaker with the same, which diminish erroneous operation from being caused by a dimmer. The OLCI detects overload in an AC electrical wiring system and produces an overload trip signal that shuts the AC source off. The OLCI includes a current transformer that produces the overload voltage in accordance with current variations in phase and neutral conductors. The OLCI also includes a rectifier for rectifying of the overload voltage, a level controller for limiting the rectified overload voltage, an integrator for charging the limited overload voltage and for providing overload indicative signal, and a comparator. The comparator compares the overload indicative signal with a reference overload voltage and produces the overload trip signal that shuts the AC source off. The circuit breaker may further include an arc fault circuit interrupter (AFCI) and a ground fault circuit interrupter (GFCI).

8 Claims, 11 Drawing Sheets

OVERLOAD CIRCUIT INTERRUPTER CAPABLE OF ELECTRICAL TRIPPING AND CIRCUIT BREAKER WITH THE SAME

FIELD OF THE INVENTION

The present invention relates to a power distribution system, and more particularly, to an overload circuit interrupter capable of detecting overload and interrupting the overload circuit interrupter, and to a circuit breaker with the same.

BACKGROUND OF THE INVENTION

Low voltage networks, typically 600 volts and below, are used to distribute electric power in a specified area, such as part of a city or an industrial or commercial area. Often, the cables in such networks are located underground. Typically, the network is designed to feed at more than one point, and therefore, has multiple sources. Occasionally, the cables have failed, due to various causes such as thermal degradation, age, moisture or rodent damage.

The networks are protected by circuit breakers. In order to isolate the faulty cable and therefore minimize disruption of the networks, cable limiters are provided at the ends of the cables. Cable limiters are fuse-like devices, which assure safe reactions to high voltage and low impedance faults, such as are created by phase-to-phase faults.

Wiring (miniature) circuit interrupters and current leakage circuit interrupter are commonly used devices for protecting people and property from fire and dangerous electrical faults. A wiring circuit interrupter is used to protect a power line. First, when excessive current passing through circuit breaker is converted to heat in the use of an electrical device, the circuit interrupter is tripped by a bending of bimetal in it. Second, when an electrical tool or other metallic object on the load shorts the power line, high current is passed through instantaneously. Therefore, bimetal in the circuit breaker is heated by high current, so the electrical device is interrupted by operation of an inner magnet of the circuit breaker.

It is known in the art that a current leakage circuit interrupter has the ability to detect current leakage, which may be present on the power line, and trip the circuit interrupter, so that the circuit interrupter prevents people from receiving an electric shock from the leakage current.

In America, ground fault circuit interrupters (GFCI) are required to be used, which contact people's hands directly, in the wiring (miniature) circuit interrupter. The GFCI, which is able to detect leakage current with high sensitivity, belongs to the category of current leakage circuit interrupters. Thus GFCI must be installed in kitchens, bathrooms, parking places and basements, which easily may become damp and wet.

In spite of the wiring circuit interrupter and current leakage circuit interrupter, large numbers of fires occur all over the world every year. This is due to the fact that often an arcing type fault to ground occurs rather than a phase-to-phase fault. Arcing faults typically create current with low root mean square (RMS) value, which is below the thermal threshold for such circuit breakers. Even so, such arcs can cause damage or start a fire if they occur near combustible material.

Arcs are potentially dangerous due to the high temperatures. An arc, however, will only trip a GFCI when it produces sufficient current leakage to ground. In addition, an arc will trip a circuit breaker only if the current, flowing through the arc, exceeds the trip parameters of the thermal/magnetic mechanism of the breaker. Therefore, an additional type of protective device is needed to detect and interrupt arcs that do not fit these criteria. An arc detector whose output is used to trigger a circuit interrupting mechanism is referred to as an arc fault circuit interrupter (AFCI).

The U.S. Consumer Product Safety Commission (CPSC) estimated that 40% of fires in 1997 were caused by arc faults. Also, the National Electric Code (NEC) includes a regulation requiring installation of the AFCI in residential buildings from January 2002.

The causes of arc faults are numerous. For example, they include aged or worn insulation and wiring, mechanical and electrical stress caused by overuse, over currents or lightning strikes, loose connections, and excessive mechanical damage to insulation and wires.

Three types of arcing may occur in residential or commercial buildings: serial arcing, parallel arcing and ground arcing.

Serial (or contact) arcing occurs between two contacts in series with a load. The conductors comprising the cable are separated and surrounded by an insulator. A portion of the conductor is broken, creating a series gap in the conductor. Under certain conditions, arcing will occur across this gap, producing a large amount of localized heat. The heat produced by the arcing might be sufficient to break down and carbonize insulation close to the arcing. If the arc is allowed to continue, enough heat will be generated to start a fire. Under these conditions, current flowing through the arc is controlled by load.

Parallel (line) arcing is the second. Cable comprises electrical conductors covered by outer insulation and separated by inner insulation. Deterioration or damage to the inner insulation at any point may cause parallel fault arcing to occur between the two conductors. The inner insulation could have been carbonized by an earlier lightning strike to the wiring system, or it could have been cut by mechanical action such as a metal chair leg cutting into an extension cord.

Ground arcing occurring between a conductor and ground is the third. If the outer insulation used for protecting conductors is damaged, the conductor contacting ground due to a damaged portion will result in ground arcing.

Current flowing through the arcing may be changed by impedance because parallel arcing and ground arcing occur parallel to the load. Long time deterioration causes cable carbonization and damage to coating. The cable is further deteriorated by Joule heat, which is induced by arcing current. The arcing generates joule heat according to the ** in a relation of J (Joule heat)=$I^2$(arcing current)×t(Time).

One major problem associated with any type of arc detection is false tripping. False tripping occurs when an arc detector produces a warning output, or disconnects a section of wiring from the voltage source, when a dangerous arcing condition does not actually exist. This problem is caused by the fact that an arc signal (arcing current and arcing voltage) is not generated in the form of a correct sine wave, and has various types of waveform. Specifically, the arc signal is similar to the driving pulse, which is created in appliances, such as an electric fan and dryer, which have an electric motor inside.

Also, if you use an electrical device, at the beginning of a cycle, a high pulse similar to the arc signal is generated, but after some time passes, the output signal has a normal amplitude. Therefore, it is difficult to detect arcing because the arc signal is similar to driving pulse at the beginning of a cycle.

The arc fault detector (AFD) disclosed in U.S. Pat. No. 5,805,397 uses a method of detecting arcing by multiple channel sensing. The prior patent discloses the method of detecting arcing in several bandwidths, and the AFD trips the circuit in a condition of arcing generation in all of the bandwidths.

A schematic diagram in block form of the prior art is shown in FIG. 1. The electrical system 100 protected by the circuit breaker 103 includes a line conductor 105 and a neutral conductor 107 connected to provide power to a load 109. The circuit breaker 103 includes separable contacts 111 that can be tripped open by a spring operated by trip mechanism 101. The trip mechanism 101 may be actuated by a conventional thermal-magnetic overcurrent device 116. This thermal-magnetic overcurrent device 116 includes a bimetal connected in series with the line conductor 105. Persistent overcurrents heat up the bimetal causing it to bend and release a latch 113, which actuates the trip mechanism 101. Short circuit currents through the bimetal 115 magnetically attract an armature 114, which alternatively releases the latch 113 to actuate the trip mechanism 101.

A schematic diagram of a prior art arc fault detection circuit is shown in FIG. 2. The arc fault detector 120 is a multi-channel bandpass filter circuit 121, which includes two channel 123, 124. The channels 123, 124 includes respectively bandpass filters 125, 126. Each bandpass filter 125, 126 has an assigned, distinct non-overlapping passband. Thus, each of the bandpass filters 125, 126 will generate an output signal in response to an are fault. Therefore the circuit breaker is tripped when the output signal, which is obtained by summing the output of the filters 125, 126 reaches at a specified level.

A block diagram illustrating an arc fault/ground fault circuit interrupter (AFCI/GFCI) device of the other prior art is shown in FIG. 3. The prior AFCI generates output signal by comparing the first arc detecting signal in the line with the second arc detecting signal in the load. The AFCI/GFCI device 180 comprises AFCI/GFCI circuitry 182, line circuitry 188, load circuitry 200, arc detection circuitry 198, local/remote inhibit circuitry 184, and timer circuitry 186. The prior art AFCI/GFCI device detects arcing faults in the line area and load area using many different elements and making the device more complex. Thus, it greatly increase efforts and the cost demanded for production. The prior art AFCI/GFCI device may control processing of electric circuits independently in response to arc generation, resulting in the comparison of line arcing and load arcing at each of line circuitry 188 and load circuitry 200. However, the prior art needs an amplifier, filter, rectifier and peak detector at both the line and the load circuitry, so more cost is incurred. Furthermore, it is difficult to install an AFCI/GFCI device in a residential place because of its large size.

Moreover, various electrical devices in addition to circuit breaker include one or more elements that protect the electrical devices or inner circuit of itself respectively from heat or damage resulting from an overload. Generally, this element is a bimetal that comprises two metallic plates, as it were, high and low expansion plates which have different coefficients of heat expansion, attached to each other by a rolling method. Each metallic plate is bent to a different degree by temperature variation. The bimetal is widely used as thermometer or automatic operational switch because it bends with relative ease even when subjected to only a small variation in temperature. More particularly, if the temperature of the bimetal increases because overcurrent is passing through an electrical device, it bends toward the side of the low expansion plate and the electrical device is interrupted. The low expansion metallic plate has a very low coefficient of heat expansion and the high expansion metallic plate has a high coefficient of heat expansion. Some alloys used for producing high expansion metallic plates are nickel-chrome-iron alloy, nickel-manganese-iron alloy, or manganese-copper-nickel alloy.

In the United States, there are various regulations controlling the triggering of a circuit breaker. For example, the circuit breaker must be triggered within 1 hour in the case of 135% current flow, and 4 minutes in the case of 200% current flow rated current for AC 120 volts, 15 or 20 A. However, because overcurrent passes through the bimetal sequentially for the test time (1 hour or 4 minutes), the duration of circuit breaker tests is long and expensive. Also, the bending characteristics of the bimetal easily change with time and use. Therefore, it is difficult to detect overload consistently since an operational feature of the circuit breaker is changed as time passes. Also, after the bimetal bends once because of an overload on it, it takes a long time to reset. Thus, there is loss of time and increased cost involved in the normal operation of the circuit breaker followed by the bending of the bimetal. Also, under various real conditions, the prior arts cannot detect an arc fault and overload, so, they cannot prevent fires from occurring in residential or commercial buildings.

SUMMARY OF THE INVENTION

The arc fault circuit interrupter (AFCI) of the present invention can effectively detect an arc fault generated in an electrical system, and so protect people and property from fire.

Also, the overload circuit interrupter (OLCI) of the present invention can detect an overload in an electrical system and can trip the electrical system electrically. The OLCI does use a mechanical device such as a bimetal, so the cost and time needed for testing circuit breaker is minimized. Also, initialization of the OLCI is accomplished at the same time the circuit breaker is tripped.

The AFCI and the OLCI of the present invention can operate in combination with a ground fault circuit interrupter (GFCI). Thus, a circuit breaker with an AFCI, GFCI and OLCI of the present invention can be provided to detect an arc fault, ground fault and overload effectively. Also, the circuit breaker is relatively small and so can be installed easily in a residential or commercial building.

Also, the circuit breaker includes a capacitor, which discharges voltage caused by arc fault, ground fault or overload correctly through the triggering of a power switch. Thus, it is possible to detect arc fault, ground fault or overload successively, and, it is easy to test the operation of the circuit breaker.

To achieve the above-mentioned objects of the present invention, provided is an overload circuit interrupter (OLCI) device in an electrical wiring system that can shut an AC (Alternating Current) source off from a phase conductor and a neutral conductor when an arc fault occurs in the AC source. The overload circuit interrupter (OLCI) may include a current transformer for producing an overload voltage in accordance with the variation of the phase conductor and in the neutral conductor, a rectifier for half-or full-wave rectifying the overload voltage, a level controller for limiting the rectified overload voltage to a specified level, an integrator for charging the limited overload voltage from the level controller and for providing an overload indicative signal, and a comparator for comparing the overload indicative signal with a reference overload voltage and for producing an overload trip signal, which shuts the AC source off from the phase conductor and the neutral conductor.

The rectifier may comprise a plurality of diodes coupled to the current transformer. The level controller may comprise a coupling element for controlling the level of the rectified overload voltage, and a buffer for delaying the charged overload voltage. The comparator may comprise an operational amplifier. The OLCI may further comprise a reference voltage generator for generating the reference overload voltage. The OLCI may further comprise a bias generator for generating a bias provided to the comparator together with the overload indicative signal. The OLCI may further comprise a discharge controller for discharging the voltage from said integrator when the AC source shuts off.

To achieve the above-mentioned objects of the present invention, also provided is a circuit breaker in an electrical wiring system that can shut an AC source off from a phase conductor and a neutral conductor when an overload occurs in the AC source. The circuit breaker may comprise an overload circuit interrupter (OLCI) coupled to the phase conductor and the neutral conductor for detecting an overload and producing an overload trip signal, a display circuitry for indicating the overload corresponding with the overload trip signal, and a trip circuitry coupled to the phase conductor and the neutral conductor, for shutting the AC source off from the phase conductor and the neutral conductor when an overload trip signal is provided, wherein the OLCI may include a current transformer for producing an overload voltage in accordance with the variation of the phase conductor and in the neutral conductor, a rectifier for half-or full-wave rectifying the overload voltage, a level controller for limiting the rectified overload voltage to a specified level, an integrator for charging the limited overload voltage from the level controller and for providing an overload indicative signal, and a comparator for comparing the overload indicative signal with a reference overload voltage and for producing an overload trip signal, which shuts the AC source off from the phase conductor and the neutral conductor.

Also, to achieve the above-mentioned objects of the present invention, provided is an arc fault circuit interrupter (AFCI) in an electrical wiring system that can shut an AC source off from a phase conductor and a neutral conductor when an arc fault occurs in the AC source. The AFCI may comprise a first current transformer for producing an arc fault voltage in accordance with the variation of current in the phase conductor and in the neutral conductor, a rectifier for half- or full-wave rectifying of the arc fault voltage, a first buffer for delaying the rectified arc fault voltage, a first comparator for comparing the rectified arc fault voltage with a first reference voltage and producing an arc fault indicative signal, an integrator for charging the arc fault indicative signal from the first comparator, and a second comparator for comparing the arc fault indicative signal with a second reference voltage and producing an arc fault trip signal.

Also, to achieve the above-mentioned objects of the present invention, there is provided a circuit breaker in an electrical wiring system that can shut an AC source off from a phase conductor and a neutral conductor when an arc fault occurs in the AC source. The circuit breaker may comprise an arc fault circuit interrupter (AFCI) coupled to the phase conductor and the neutral conductor for detecting an arc fault and producing an arc fault trip signal, a display circuitry for indicating the arc fault corresponding with the arc fault trip signal, and a trip circuitry coupled to the phase conductor and the neutral conductor, for shutting the AC source off from the phase conductor and the neutral conductor corresponding with the arc fault trip signal, wherein the AFCI may include a first current transformer for producing an arc fault voltage in accordance with the variation of current in the phase conductor and in the neutral conductor, a rectifier for half- or full-wave rectifying of the arc fault voltage, a first buffer for delaying the rectified arc fault voltage, a first comparator for comparing the rectified arc fault voltage with a first reference voltage and producing an arc fault indicative signal, an integrator for charging the arc fault indicative signal from the first comparator, and a second comparator for comparing the arc fault indicative signal with a second reference voltage and producing an arc fault trip signal.

Also, to achieve the above-mentioned objects of the present invention, there is provided a circuit breaker in an electrical wiring system that can shut an AC source off from a phase conductor and a neutral conductor when an overload occurs in the AC source. The circuit breaker may comprises an arc fault circuit interrupter (AFCI) coupled to the phase conductor and the neutral conductor for detecting an arc fault and producing an arc fault trip signal, an overload circuit interrupter (OLCI) coupled to the phase conductor and the neutral conductor for detecting an overload and producing an overload trip signal, a display circuitry for indicating the arc fault or overload corresponding with the arc fault trip signal or overload trip signal, and a trip circuitry coupled to the phase conductor and the neutral conductor, for shutting the AC source off from the phase conductor and the neutral conductor corresponding with the arc fault trip signal or overload trip signal, wherein the AFCI may include a first current transformer for producing an arc fault voltage in accordance with the variation of current in the phase conductor and in the neutral conductor, a rectifier for half-or full-wave rectifying the arc fault voltage, a first buffer for delaying the rectified arc fault voltage, a first comparator for comparing the rectified arc fault voltage with a first reference voltage and producing an arc fault indicative signal, an integrator for charging the arc fault indicative signal from the first comparator, and a second comparator for comparing the arc fault indicative signal with a second reference voltage and producing an arc fault trip signal, and wherein the OLCI may include a current transformer for producing an overload voltage in accordance with the variation of the phase conductor and in the neutral conductor, a rectifier for half-or full-wave rectifying the overload voltage, a level controller for limiting the rectified overload voltage to a specified level, an integrator for charging the limited overload voltage from the level controller and for providing overload indicative signal, and a comparator for comparing the overload indicative signal with a reference overload voltage and producing an overload trip signal, which shuts the AC source off from the phase conductor and the neutral conductor.

Also, to achieve the above-mentioned objects of the present invention, there is provided a circuit breaker in an electrical wiring system that can shut an AC source off from a phase conductor and a neutral conductor when an overload occurs in the AC source. The circuit breaker may comprises an arc fault circuit interrupter (AFCI) coupled to the phase conductor and the neutral conductor for detecting an arc fault and producing an arc fault trip signal, an overload circuit interrupter (OLCI) coupled to the phase conductor and the neutral conductor for detecting an overload and producing an overload trip signal, a ground fault circuit interrupter (GFCI) coupled to the phase conductor and the neutral conductor for detecting a ground fault and producing a ground fault trip signal, a display circuitry for indicating the arc fault, ground fault or overload corresponding with at least one selected from the group consisting of the arc fault trip signal, the ground fault trip signal and the overload trip signal; and a trip circuitry coupled to the phase conductor and the neutral conductor, for shutting the AC source off from the phase conductor and the neutral conductor corresponding with at least one selected from the group consisting of the arc fault trip signal, the ground fault trip signal and the overload trip signal.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Hereinafter, the preferred embodiments of the present invention will be explained in more detail with reference to the accompanying drawings.

Figure 1:
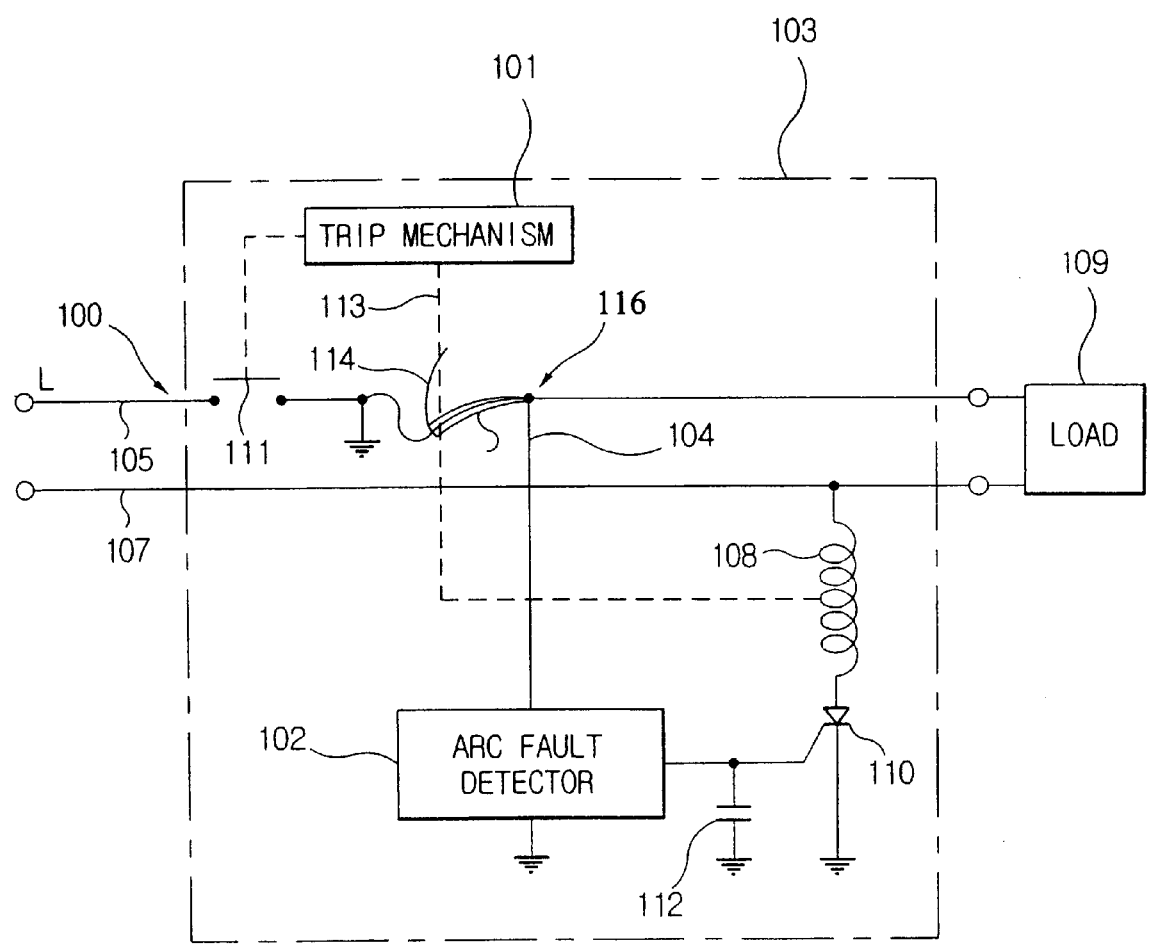
FIG. 1 is a schematic diagram in block form illustrating an example of a prior art arc fault detector.
Figure 2:
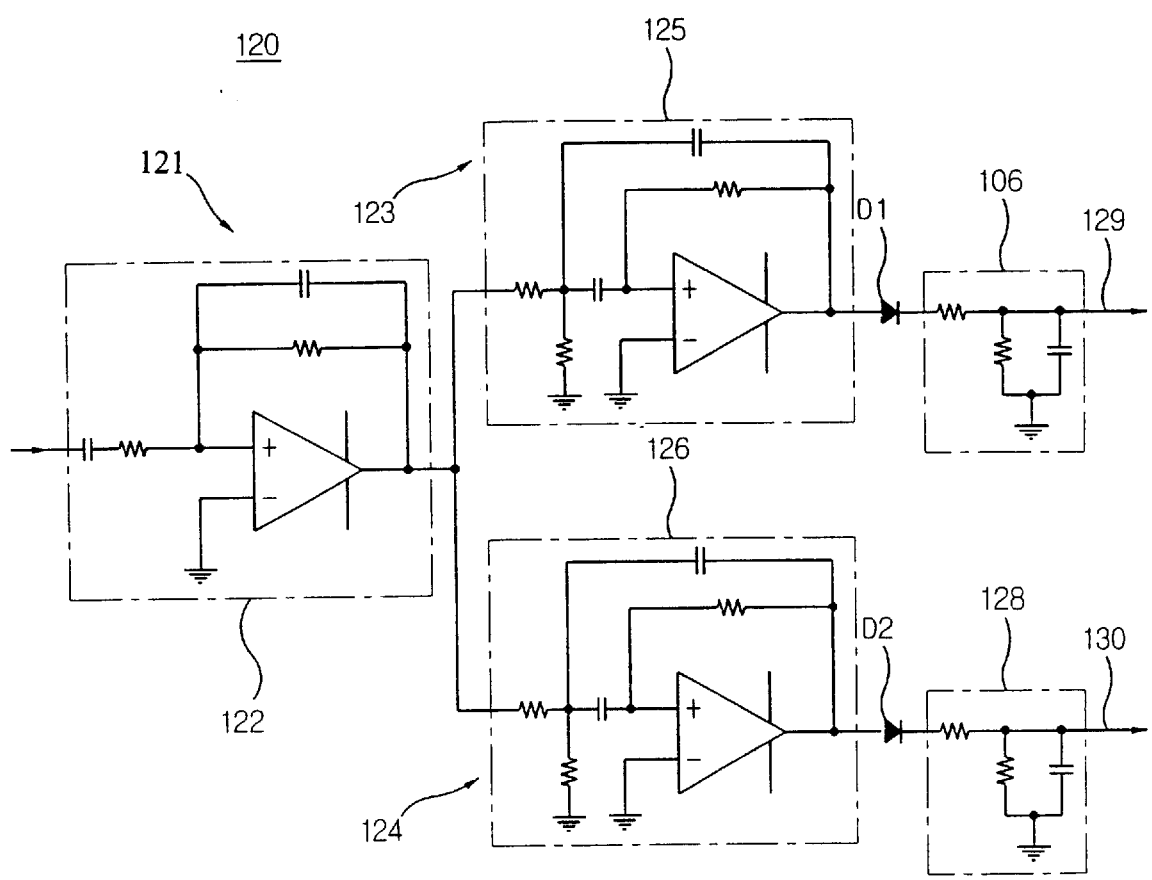
FIG. 2 is a schematic diagram illustrating an example of a prior art arc fault detection circuit in FIG. 1.
Figure 3:
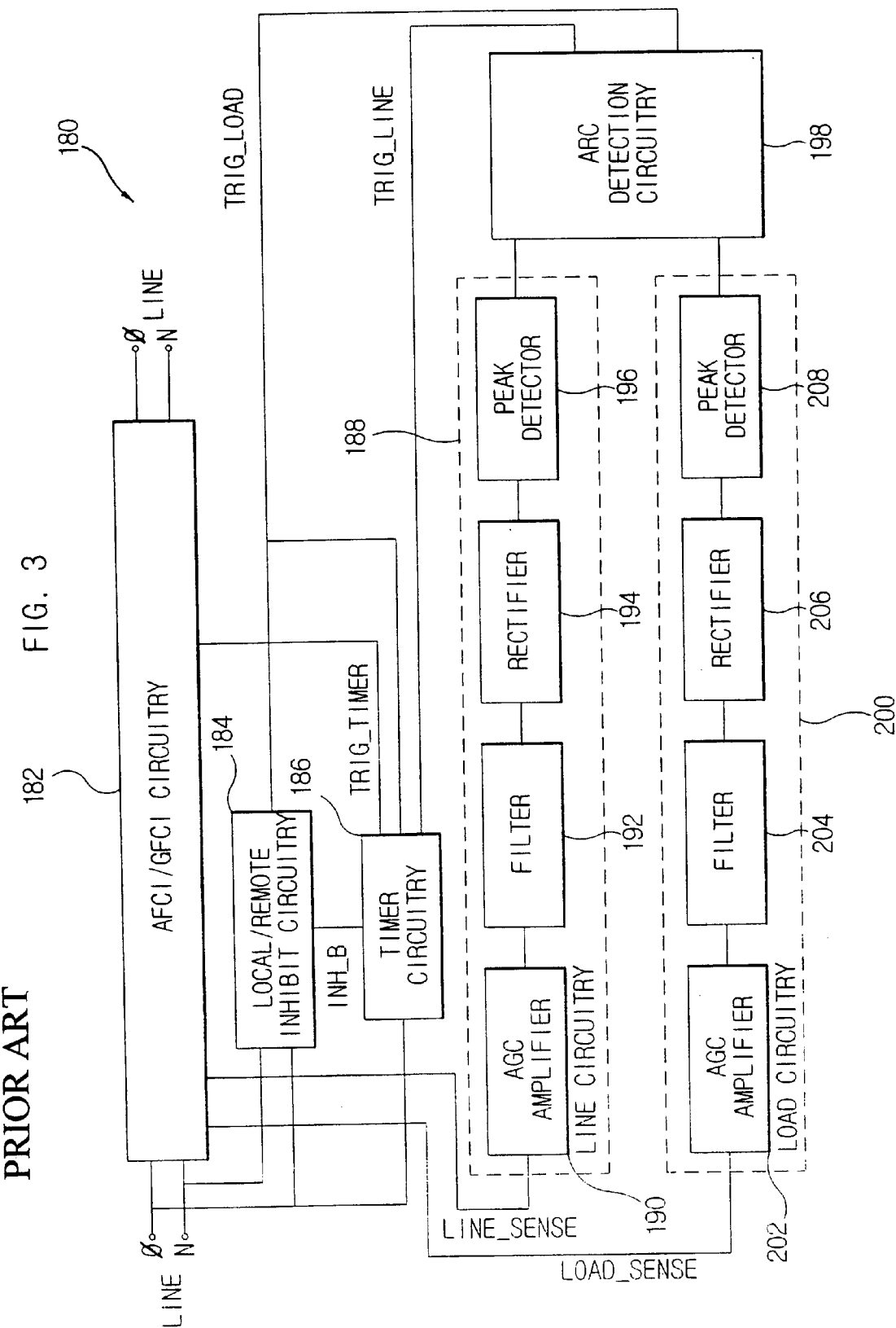
FIG. 3 is a block diagram illustrating another example of a prior art arc fault/ground fault circuit interrupter (AFCI/GFCI) device.
Figure 4:
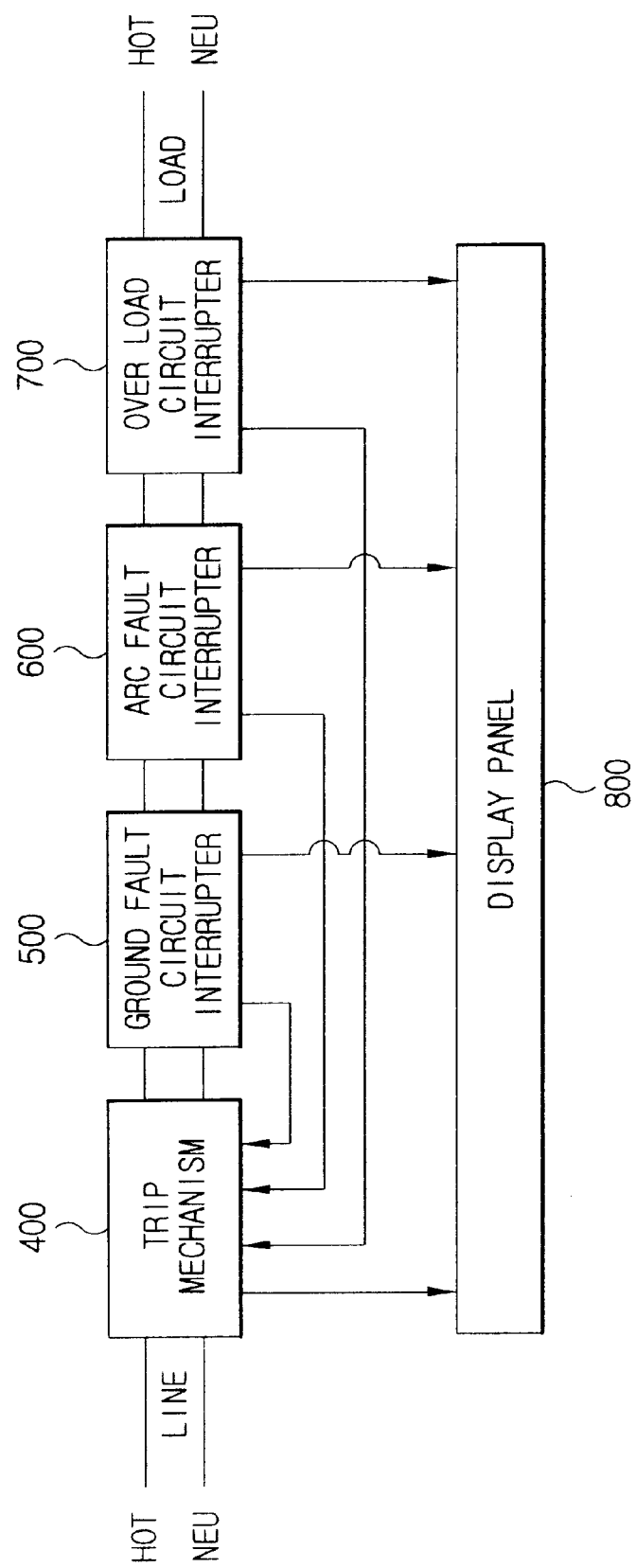
FIG. 4 is a block diagram illustrating a circuit breaker comprising an AFCI, GFCI, and OLCI of the present invention.

A block diagram illustrating a circuit breaker comprising an AFCI, GFCI, and OLCI of the present invention is shown in FIG. 4. The circuit breaker includes an arc fault circuit interrupter (AFCI) 600, a ground fault circuit interrupter (GFCI) 500, an overload circuit interrupter (OLCI) 700, and a trip mechanism 400 between phase wire (HOT) and neutral wire (NEU). A display panel 800 displays faults indicating arc fault, ground fault or overload to the outside according to the output signals of AFCI 600, GFCI 500 or OLCI 700 respectively. Also, the display panel 800 can be controlled by the trip mechanism 400. The display panel 800 may comprise display devices for displaying arc fault, ground fault and overload respectively. The trip mechanism 400 disconnects AC power to the circuit breaker when an arc fault, ground fault or overload is detected. When power enters the circuit breaker via a power switch of the trip mechanism 400, the display devices of the display panel 800 are turned off simultaneously.

Figure 5:
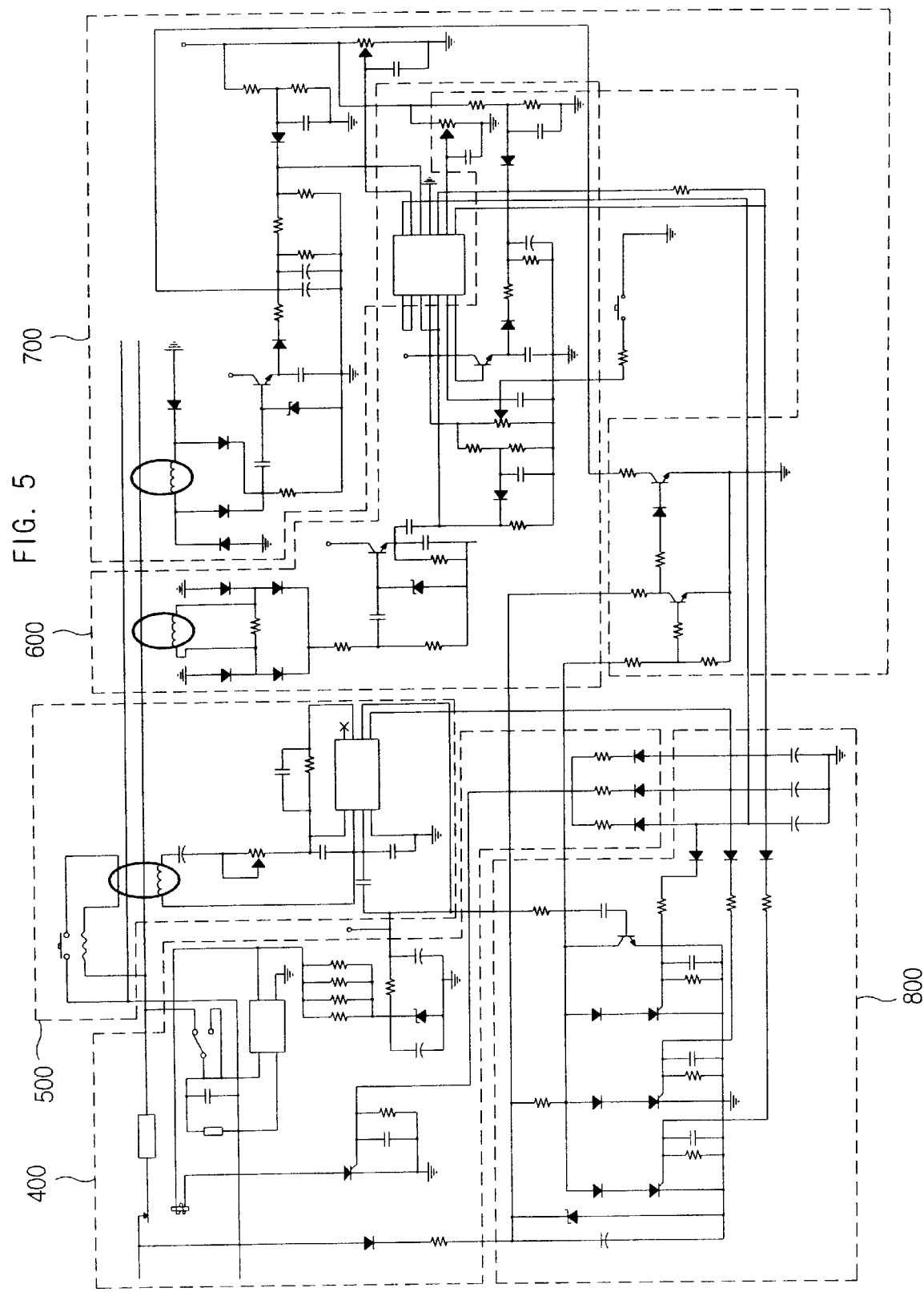
FIG. 5 is a schematic diagram illustrating a circuit breaker comprising an AFCI, GFCI, and OLCI of the present invention in more detail.

A schematic diagram illustrating a circuit breaker comprising the AFCI, GFCI, and OLCI of the present invention in more detail is shown in FIG. 5. Also, referring to FIG. 9, (which is referenced in even greater detail further below) the GFCI 500 includes a zero current transformer (ZCT), which detects a variation of current, coupled between a phase wire HOT and a neutral wire NEU. The zero current transformer (ZCT) compares inflow current with outflow current on the phase wire HOT and neutral wire NEU. The zero current transformer (ZCT) generates high-level ground fault voltage when the inflow current is different from the outflow current. The GFCI includes a filter for limiting the ground fault voltage of the ZCT, a reference voltage generator for providing an operational signal, a comparator and a delay circuit. If current leakage is detected on the AC line of the phase wire HOT and the neutral wire NEU, the comparator compares the limited ground fault voltage from the filter with the reference voltage. When the limited ground fault voltage is greater than the reference voltage, the comparator produces a high-level ground fault indicative signal. If the high-level ground fault indicative signal, which is charged in the delay circuit, exceeds a specified trip level, the delay circuit provides a ground fault trip signal for tripping the circuit breaker to the trip mechanism 400 and a ground fault display signal to the display panel 800. Also, the GFCI 500 may include a test switch for testing the operation of the GFCI.

Figure 6:
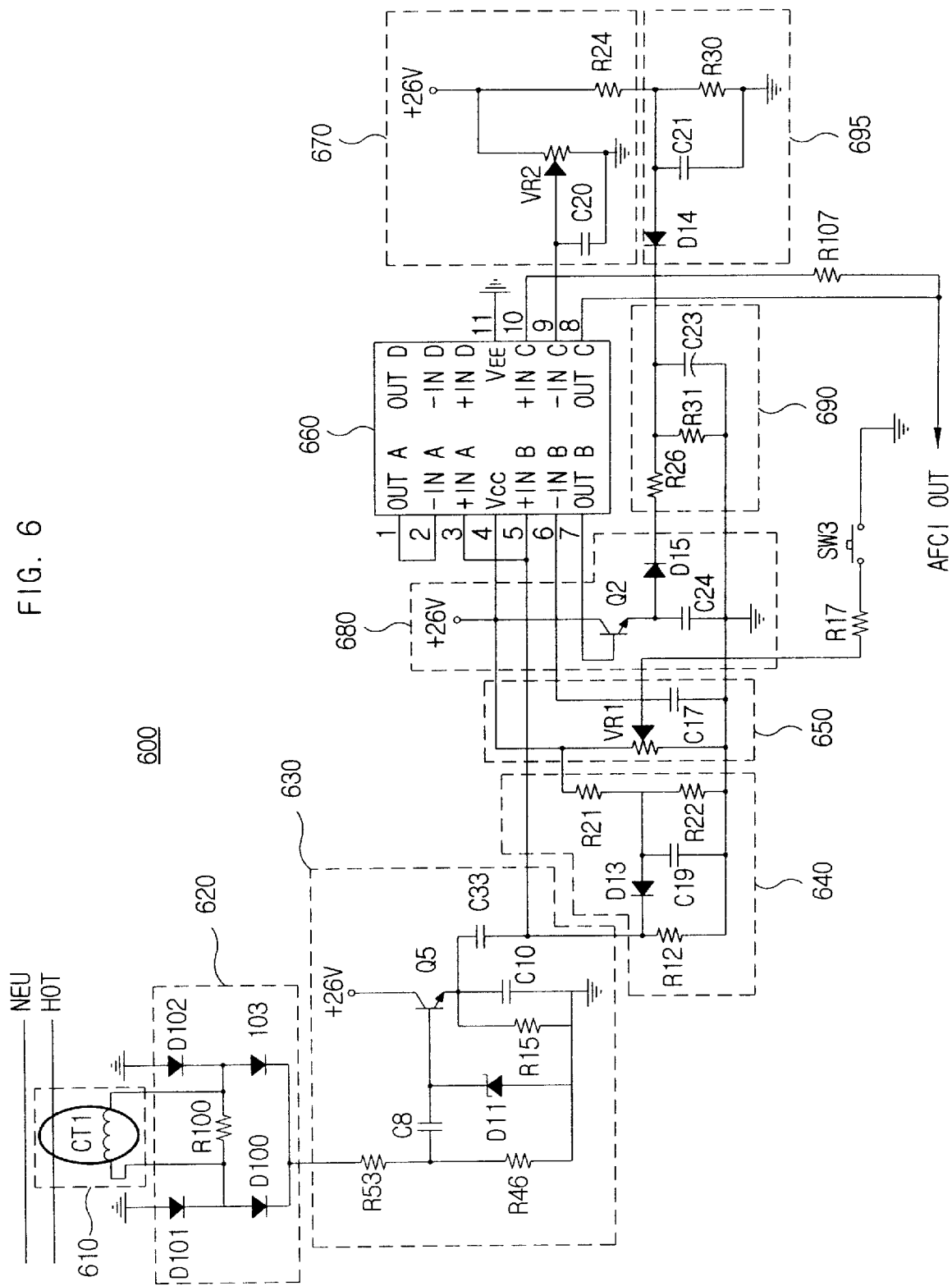
FIG. 6 is a schematic diagram illustrating the AFCI of the present invention.

Referring also to FIG. 6 (which is referenced in even greater detail further below), the AFCI 600 includes a current transformer (CT). The current transformer (CT) detects a variation of current between the phase wire HOT and the neutral wire NEU and produces an arc fault voltage. The AFCI 600 rectifies and limits the arc fault voltage into a specified range and provides an arc fault indicative signal in accordance with the result of comparing the limited arc fault voltage with the reference voltage. Also, the AFCI 600 sends an arc fault trip signal to the trip mechanism 400 for tripping the circuit breaker and an arc fault display signal to the display panel 800 in case of an arc fault occurrence when the arc fault indicative signal corresponds to a predetermined level. In the present invention, the comparator in the AFCI 600 is a KIA324 integrated circuit (IC), a quad operational amplifier manufactured by Korea Electronics Co. LTD (KEC). However, it will be appreciated that many other ICs may be used in the present prevention. Also, the AFCI 600 may include a capacitor, which charges the arc fault indicative signal and produces an arc fault trip signal in the case of continuous arc fault. Therefore, it is possible to prevent an erroneous tripping caused by the initial driving voltage of an electrical device. The AFCI 600 also includes a resistor for distinguishing between an arc fault and the driving voltage of a dimmer.

Figure 7:
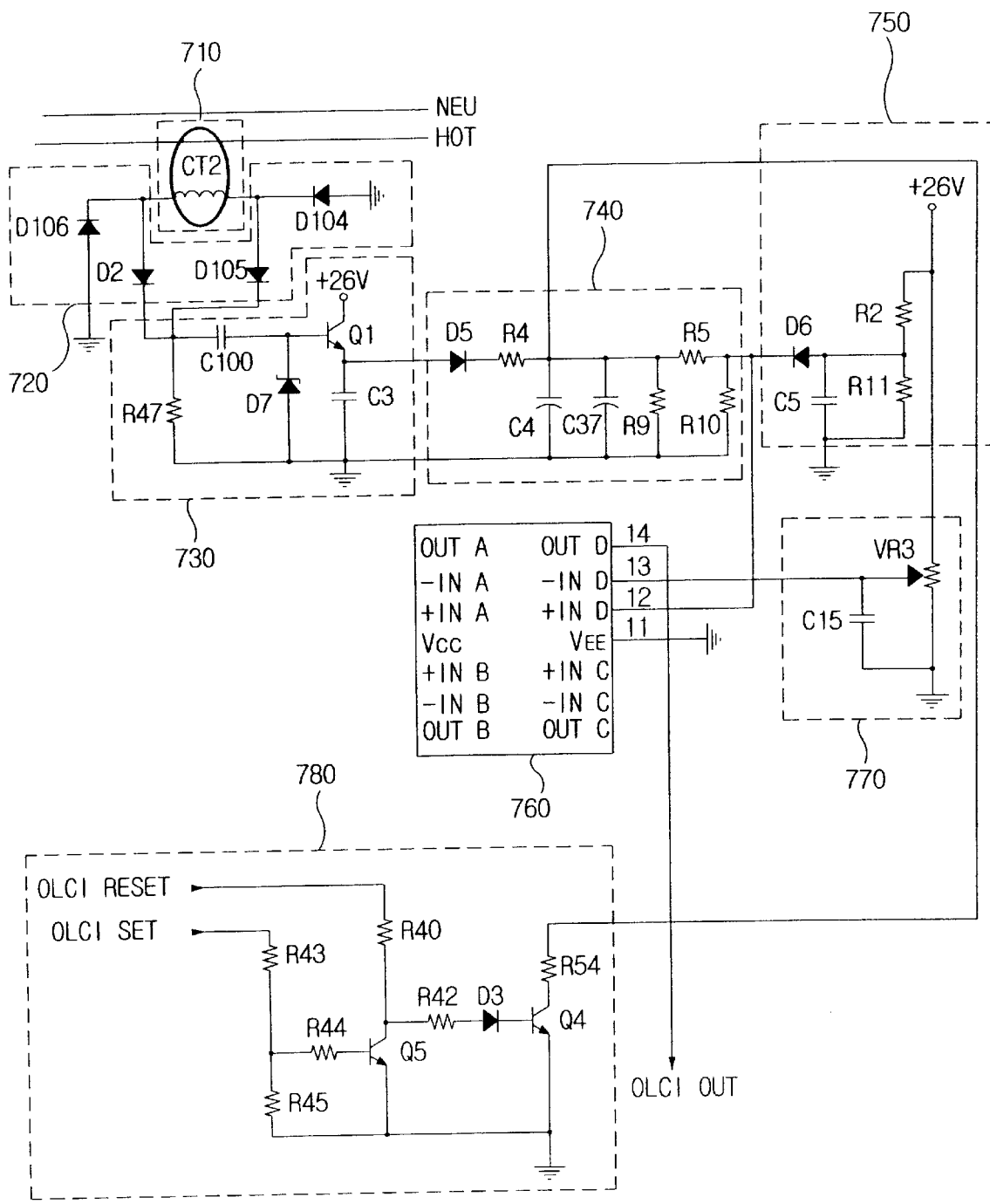
FIG. 7 is a schematic diagram illustrating the OLCI of the present invention.

Referring also to FIG. 7 (which is referenced in even greater detail further below), the OLCI 700 includes a current transformer (CT) for detecting a variation of current between the phase wire (HOT) and the neutral wire (NEU) and for producing an overload voltage. The overload voltage is limited to a specified level and charged in a capacitor. If the charged voltage is greater than the reference voltage, an overload trip signal is provided to the trip mechanism 400 for tripping the circuit breaker and an overload display signal is provided to the display panel 800. The OLCI 700 also includes a capacitor for distinguishing between an overload and the driving voltage of a dimmer. A prior art OLCI includes a bimetal for detecting overload. The bimetal takes a long time to detect overload and then return to an original state. In the present invention, since the OLCI 700 does not use a bimetal and has an auto reset circuit coupled to a capacitor for charging the overload voltage, it is possible to detect overload rapidly and successively.

Figure 11:
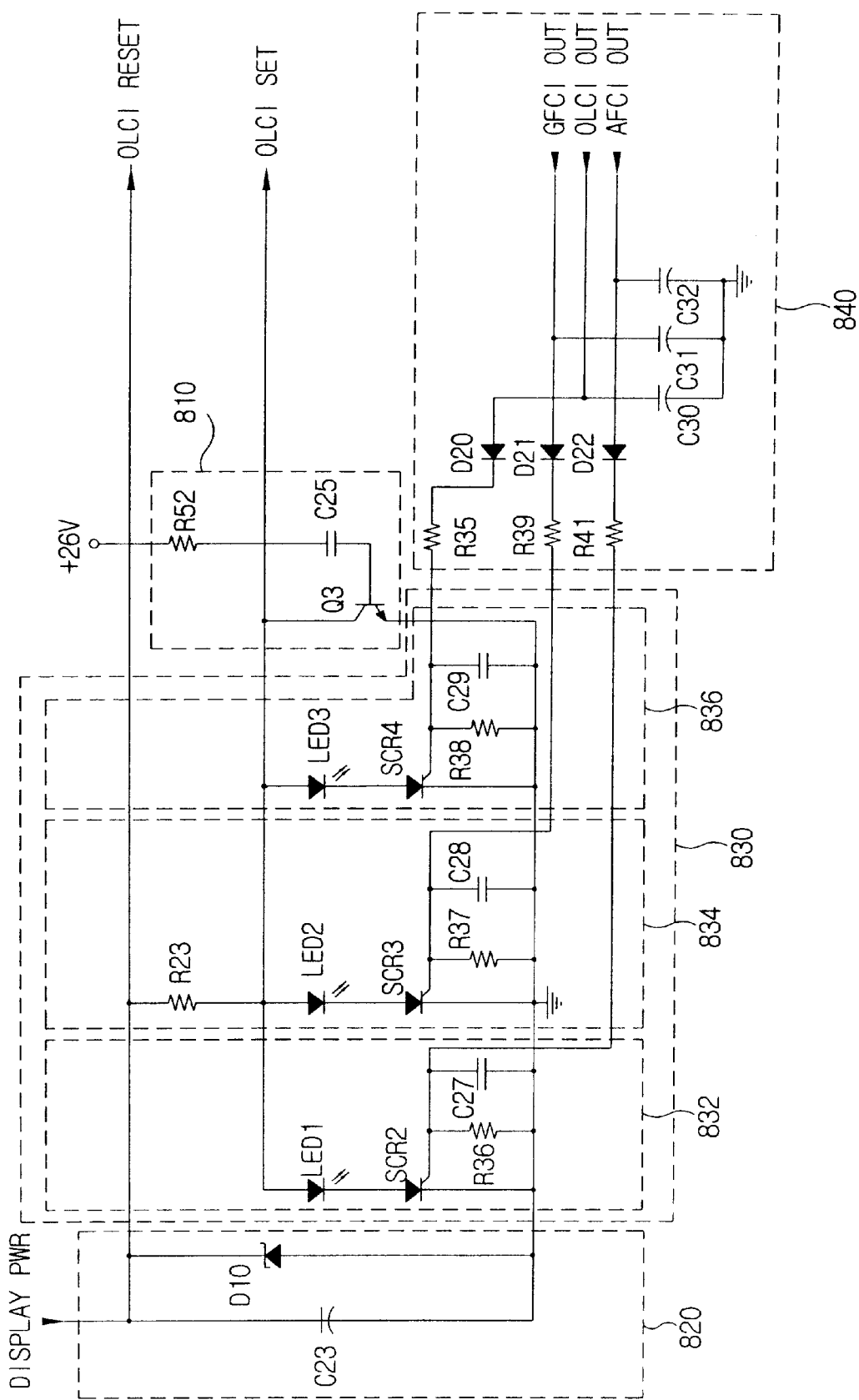
FIG. 11 is a schematic diagram illustrating a display panel of the present invention.

Referring also to FIG. 11 (which is reference in even greater detail further below), the display panel 800 includes display elements, which comprises an arc fault display element for indicating an arc fault, a ground fault display element for indicating a ground fault and an overload display element for indicating an overload. The display elements are light emitting diodes (LED) in the present invention, but other display devices may be equally appropriate.

Figure 10:
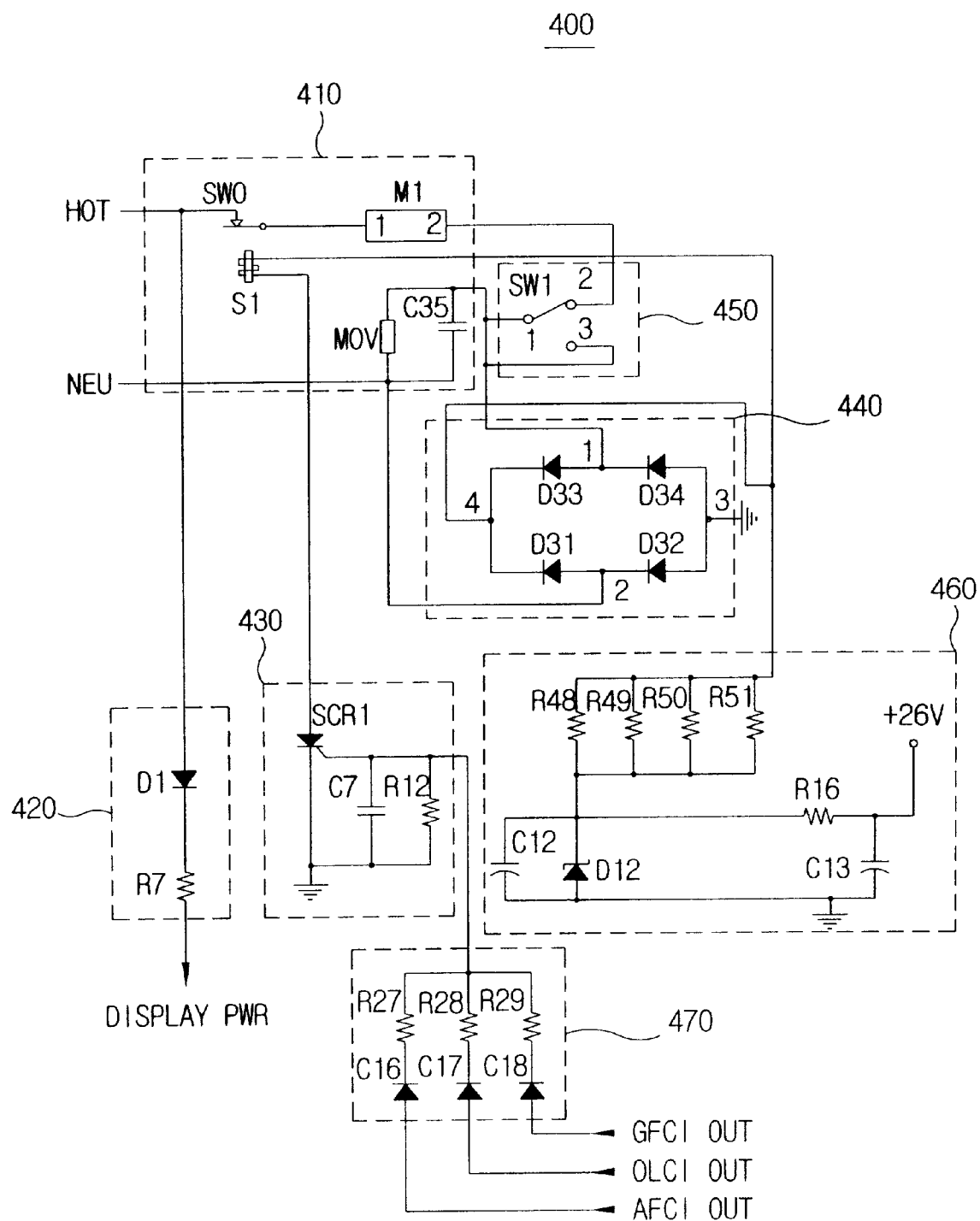
FIG. 10 is a schematic diagram illustrating a trip mechanism of the present invention.

Referring also to FIG. 10. (which is referenced in even greater detail further below), the trip mechanism 400 may include a power switch and a solenoid for mechanical controlling the on/off of the circuit breaker, a switch-controlling element such as a silicon controlled rectifier (SCR) and a tripping element for tripping the circuit breaker in case of a continuous increase in current going through the circuit breaker. The power switch turns off the circuit breaker via the solenoid in accordance with the arc fault trip signal, ground fault trip signal or overload trip signal. The tripping element may be a bimetal or resistive metal.

A schematic diagram illustrating the AFCI of the present invention in more detail is shown in FIG. 6. A current detector 610 detects a variation of current between the phase wire HOT and the neutral wire NEU, and produces an arc fault voltage in accordance with the variation of current. A rectifier 620 rectifies the arc fault voltage and distinguishes between driving voltage caused by a dimmer in an electrical device and the arc fault. The rectified arc fault voltage is delayed through a first buffer 630. The delayed arc fault voltage enters a comparator 660. The comparator 660 compares the arc fault voltage from the first buffer 630 with a reference voltage, and produces an arc fault indicative signal. In the present invention, the comparator 660 is a KIA324 IC, quad operational amplifier manufactured by Korea Electronics Co. LTD (KEC). However, it will be appreciated that many other ICs may be used in the present invention.

Figure 8:
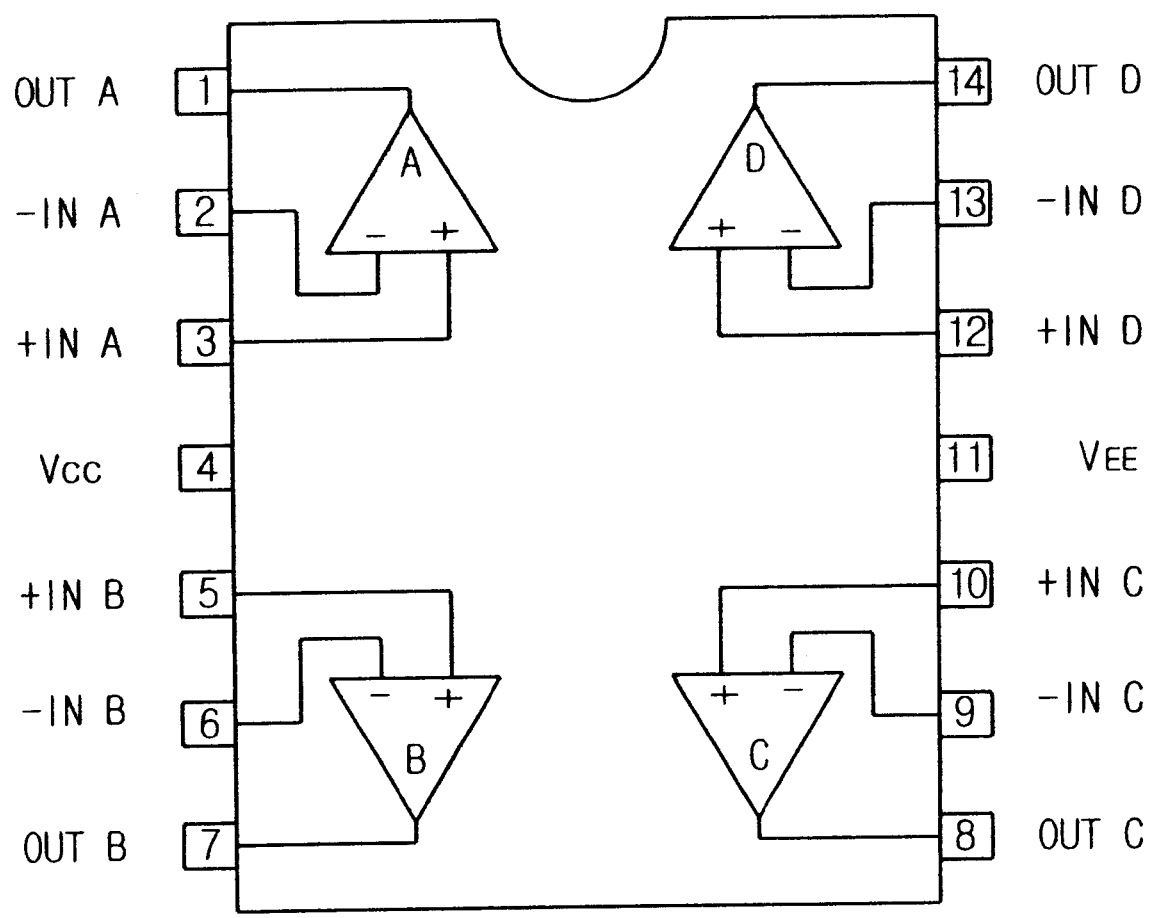
FIG. 8 is a schematic diagram illustrating a voltage comparator in the AFCI and OLCI of the present invention.

An inner schematic diagram illustrating the KIA324 IC of the present invention in more detail is shown in FIG. 8. The KIA324 IC comprises four operational amplifiers A, B, C and D each to compare two input signals that have been applied to respectively non-inverting and inverting input terminals. The KIA324 as comparator 660 has eight input terminals (+IN A, −IN A, +IN B, −IN B, +IN C, −IN C, +IN D and −IN D), four output terminals (OUT A, OUT B, OUT C and OUT D), a power terminal (VCC) and a ground terminal (VEE). A first bias generator 640 provides a bias to the +IN B terminal of the B operational amplifier and the first reference voltage generator 650 provides a reference voltage to the −IN B terminal of the B operational amplifier. A second bias generator 695 provides a bias to the +IN C terminal and a second reference voltage generator 670 provides a reference voltage to the −IN C terminal of the C operational amplifier. A second buffer 680 delays an arc fault indicative signal from the OUT B terminal of the B operational amplifier. An integrator 690 charges the buffered arc fault indicative signal supplied from the OUT B terminal and provides the charged arc fault indicative signal to the +IN C terminal of the C operational amplifier. The C operational amplifier compares the charged arc fault indicative signal with the second reference voltage. The C operational amplifier provides the arc fault trip signal to the trip mechanism 400 when the charged arc fault indicative signal is greater than the second reference voltage.

The structure and operation of the AFCI 600 will be explained in more detail.

A current transformer CT can be used to detect a variation of current on the AC line, even though prior AFCI circuit, such as is described in U.S. Pat. No. 5,963,406 used an integrated circuit. For example, LM1851 was used for detecting a variation of current. In the case of using an LM1851 IC, two magnetic cores and two coils are needed to detect a variation of current, because the IC determines an arc fault from two detected signals via cores and coils. However, in the present invention, it is possible to use only one current transformer for detecting a variation of current without an IC. The current detector 610 comprises a current transformer CT1, which includes a magnetic core and a coil to be installed on the phase wire HOT. The current transformer CT1 detects a variation of current on the AC line. The variation of current is converted to an arc fault voltage and the arc fault voltage enters into the rectifier 620. The detected variation of current through the current detector 610 is similar to a dimmer as well as to driving current depending upon the operation of an electric motor. Therefore, a resistor R100 is inserted into the ends of the current transformer CT1 in order to differentiate between a driving voltage of a dimmer and an arc fault. For the sake of full wave rectification, diodes D101 and D102 are coupled between the resistor R100 and a ground. Also, each anode of diodes D100 and D103 is coupled to the resistor R100 and cathodes of the diodes D100 and D103 are connected together. Having described and illustrated the principles of full wave rectification with reference to an illustrated embodiment, it will be recognized that a half wave rectification can be embodied. In other words, current detection can be accomplished using half wave rectification because alternative current generally has a frequency of 60 Hz or higher.

The rectified arc fault voltage from the rectifier 620 is delayed through a first buffer 630, which is composed of a common emitter amplifier. A plurality of resistors R53, R46 of the first buffer 630 are serially coupled between cathodes of diodes D100, D103, and ground. A capacitor C8 is coupled between the inner node of the resistors R53, R46 and the base of a bipolar junction transistor (BJT) Q5. A power voltage +26V is supplied to a collector in the transistor Q5. A capacitor C10 and a resistor R15 are coupled in parallel between an emitter of the transistor Q5 and ground. Also, a zener diode D11, which is coupled between the base of the transistor Q5 and ground, limits the arc fault voltage of a base of the transistor Q5 to a low level. In general, the base voltage of the transistor Q5 will be limited to a maximum of 20 volts. A coupling capacitor C33 is connected to the emitter in the transistor Q5 to cut off any direct voltage from the delayed arc fault voltage.

The delayed arc fault voltage is provided to the +IN B, +IN A terminal of the comparator 660. In the present invention, the comparator 660 is a quad operational amplifier, KIA324 IC manufactured by KEC. A power voltage of +26V is supplied to the VCC terminal. The first bias generator 640 includes a resistor R12 connected between the coupling capacitor C33 and ground. A cathode of a diode D13 is coupled to a node between the coupling capacitor C33 and the resistor R12. A capacitor C19 is parallel with a resistor R22 between the anode of the diode D13 and ground. A power voltage +26V is supplied to the anode of the diode D13 through a resistor R21. As it were, the resistors R21, R22 are coupled serially between the +26V power voltage and ground, so a bias is provided to the +IN B terminal of the B operational amplifier in the comparator 640 through the diode D13. The diode D13 is used for providing bias voltage to the B operational amplifier, and the resistor R12 is used for preventing erroneous operation of the comparator by decreasing the impedance of the +IN B terminal. Also, the capacitor C19 is used for diminishing noise from the bias. The first reference voltage generator 650 includes a variable resistor VR1, which is coupled between the +26V power voltage and ground, and a capacitor C17, which is coupled between the −IN B terminal of the B operational amplifier and ground. A charging voltage in the capacitor C17 is changeable in accordance with control of the variable resistor VR1, and therefore a reference voltage provided to the −IN B terminal of the B operational amplifier is determined.

In the case of an arc fault in the circuit breaker, an arc fault voltage through the current detector 610, rectifier 620 and first buffer 630 is provided to the +IN B terminal with a bias from the first bias generator 640. Also, a reference voltage is provided to the −IN B terminal of the B operational amplifier. The B operational amplifier compares the arc fault voltage of the +IN B terminal and the reference voltage of the −IN B terminal. When the arc fault voltage is greater than the reference voltage, the B operational amplifier generates at the OUT B terminal a high-state arc fault indicative signal. A second buffer 680 includes a transistor Q2, which has a base coupled to the OUT B terminal of the comparator 660, a collector coupled to the +26V power voltage and an emitter coupled to ground through a capacitor C24, and a diode D15. The anode of this diode D15 is coupled to the emitter of the transistor Q2. An integrator 690 is coupled to the cathode of the diode D15. The integrator 690 includes resistors R26, R31 and a capacitor C23. The resistor R26 is coupled to the cathode of the diode D15. The resistor R31 is parallel with the capacitor C23 and they are coupled between the resistor R26 and ground. If an arc fault is generated in the circuit breaker, the arc fault indicative signal is charged successively at the capacitor C23 in the integrator 690. On the other hand, an electrical driving voltage is only generated at the driving time. Therefore, the charged electrical driving voltage is discharged right away from the capacitor C23.

The charged arc fault indicative signal at the capacitor C23 owing to generation of the arc fault is provided to the +IN C terminal of the C operational amplifier. Also, a second bias generator 695 is coupled to the +IN C terminal. The second bias generator 695 includes resistors R24, R30 and a diode D14. The resistor R24 coupled to a power voltage of +26V is in series with the resistor R30, which is coupled to ground. The anode of the diode D14 is coupled to an inner node between the resistors R24 and R30, and the cathode of that diode is coupled to the +IN C terminal of the C operational amplifier. A capacitor C21 is connected for diminishing noise between the anode of the diode D14 and ground. Therefore, in the case of a non-arc fault, a fixed voltage is provided to the +IN C terminal from the second bias generator 695 and in the case of an arc fault, the charged arc fault indicative signal is provided to that terminal from the capacitor C23. A second reference voltage generator 670 provides a reference voltage to the −IN C terminal of the C operational amplifier. The second reference voltage generator 670 includes a variable resistor VR2 coupled between a power voltage of +26V and ground, and a capacitor coupled between the variable resistor VR2 and ground. Hence, a reference voltage applied to the −IN C terminal is controlled by a value of the variable resistor VR2. Therefore, the comparator 660 compares the input voltage (arc fault indicative signal) of the +IN C terminal from the integrator 690 with the reference voltage of the −IN C terminal from the second reference voltage generator 670. So, the comparator 660 provides an arc fault trip signal AFCI OUT for tripping the circuit breaker when the arc fault indicative signal is greater than the reference voltage. A residential D operational amplifier in the comparator 660 can be used to detect overload. Also, the AFCI 600 may include a test switch SW3 and a resistor R17 connected between the test switch SW3 and the −IN B terminal.

A schematic diagram illustrating the OLCI of the present invention in more detail is shown in FIG. 7. In the present invention, the circuit breaker can not use a bimetal for detecting an overload. This is because the OLCI 700 is composed of a current detector 710, a rectifier 720, a voltage level controller 730, an integrator 740, a bias generator 750, a comparator 760, a reference voltage generator 770 and a discharge controller 780.

The current detector 710 may be a current transformer (CT) for detecting a variation of a load current on the phase wire HOT. The current transformer CT2 provides an overload voltage from the variation of current. The rectifier 720 includes a plurality of diodes D2, D104, D105, D106. The anode of the diode D104 is coupled to ground and the cathode is coupled to one side of the current transformer CT2. The anode of the diode D106 is coupled to the other side of the current transformer CT2 and the cathode is coupled to ground. The anode of the diode D105 is coupled to one side of the current transformer CT2 and the anode of the diode D2 is coupled to the other side. Cathodes of the diodes D105, D2 are connected to each other. Therefore, the rectifier 720 rectifies the overload voltage provided from the current transformer CT2 with full-wave. Having described and illustrated the principles of full-wave rectification with reference to an illustrated embodiment, it will be recognized that a half-wave rectification can be embodied. In the voltage level controller 730, a resistor R47 is coupled between cathodes of the diodes D2, D105 and ground. A capacitor C100 is coupled to cathodes of the diodes D2, D105. The cathode of a zener diode D7 is coupled to the capacitor C100 and the anode of the diode D7 is coupled to ground. The base of the transistor Q1 is coupled to the cathode of the zener diode D7. A power voltage of +26V is supplied to a collector and a capacitor C3 is coupled between an emitter of the transistor Q1 and ground. The capacitor C100 is used to diminish the level of the rectified overload voltage for preventing error operation triggered by driving voltage of a dimmer. The transistor Q1 delays the voltage through the capacitor C100 and the zener diode D7 is used to limit the level of the peak voltage due to a rapid variation of current. Therefore, the OLCI 700 is protected from the rapid variation of current and erroneous operation caused by a dimmer. The integrator 740 is used for charging the output of the voltage level controller 730. A diode D5 and a resistor R4 are coupled in series to the emitter of the transistor Q1. The anode of the diode D5 is coupled to the emitter of the transistor Q1 and a resistor is coupled to the cathode of the diode D5. Capacitors C4, C37 and a resistor R9 are coupled between the resistor R4 and ground. The capacitors C4, C37 are used for charging the output voltage of the transistor Q1 and providing an overload indicative signal. The diode D5 is used for preventing inverse flow of charged voltage from the capacitors C4, C37. A resistor R4 prevents a miss-charging at the capacitors C4, C37 due to an instantaneous variation of current in the electrical device. A resistor R5 is laid between the resistor R4 and the +IN D terminal of the D operational amplifier in the comparator 760. A resistor R10 is coupled between the +IN D terminal and ground. A resistor R9 determines the charging time at the capacitors C4, C37. Resistors R5, R10 have the role of limiting the input voltage on the +IN D terminal of the D operational amplifier and preventing erroneous operation of the D operational amplifier caused by a decrease in the input impedance. The charged voltage at capacitors C4, C37 is supplied to the +IN D terminal through the resistor R5 and reference voltage is provided to the −IN D terminal, so the D operational amplifier provides the overload trip signal based on a comparison of these voltages. The bias generator 750 provides a bias to the +IN D terminal of the D operational amplifier. Therefore, in the case of non-overload, a fixed voltage is provided to the +IN D terminal from the bias generator 750 and in the case of an overload, the charged overload indicative signal in the capacitors C4, C37 is provided to the +IN D terminal. The bias generator 750 includes resistors R2, R11, a diode D6 and a capacitor C5. Resistors R2, R11 are laid in series between a power voltage of +26V and ground. The anode of the diode D6 is connected to the inner node of resistors R2, R11 and the cathode is coupled to the +IN D terminal of the D operational amplifier. The capacitor C5 is coupled between the anode of the diode D6 and ground. A bias is generated through the serial resistors R2, R11 and provided to the +IN D terminal. The capacitor is used for diminishing noise from the bias. The diode D6 prevents the overload indicative signal from the capacitors C4, C37 from entering to the bias generator 750. The reference voltage generator 770 includes a variable resistor VR3 coupled between a power voltage of +26V and ground, and a capacitor C15 laid between the −IN D terminal and ground. The reference voltage is supplied to the −IN D terminal according to control of the variable resistor VR3. Therefore, the comparator 760 (660) compares the input voltage (overload indicative signal) of the +IN D terminal from the integrator 740 with a reference voltage of the −IN D terminal from the reference voltage generator 770. So, the comparator 760 provides an overload trip signal OLCI OUT for tripping the circuit breaker when the overload indicative signal is greater than the reference voltage.

The prior OLCI, which uses a bimetal as a means for detecting overload, needs a long time for bending and returning to its natural position in which the circuit is uninterrupted. Therefore, overload detection cannot be accomplished properly and efficiently. In the present invention, under the condition of an overload, the circuit breaker is tripped by the voltage charge and discharge in the capacitors C4, C37. Also, for the sake of rapid voltage discharge from the capacitors C4, C37 after tripping of the circuit breaker, a discharge controller 780 may be included. Therefore, it is possible to detect overload and stand ready for detecting overload rapidly. Also, the time and cost required for testing can be decreased.

The discharge controller 780 can control discharge of the capacitors C4, C37 according to OLCI RESET and OLCI SET signals from the display panel 800. The discharge controller 780 includes transistors Q4, Q5, resistors R40, R42, R43, R45, R54 and a diode D3. The collector of the first transistor Q4 is coupled to the capacitors C4, C37 of the integrator 740 through the resistor R54 and the emitter is coupled to ground. A collector of the transistor Q5 is coupled to the base of the transistor Q4 through a resistor R42 and a diode D3. An anode of the diode D3 is connected to the resistor R42 and a cathode is connected to the base of the transistor Q4. The OLCI RESET signal is supplied to the collector of the transistor Q5 through the resistor R40. The base of the transistor Q5 is coupled to the resistor R44. Resistors R43, R45 are laid in series between the OLCI SET line and ground. The inner node of the resistors R43, R45 is connected to the resistor R44. The OLCI SET signal is supplied to the base of the transistor Q5 through the resistors R43, R44.

In the case where an overload is not detected in the OLCI 700, the voltage level of the OLCI RESET signal is equal to that of the OLCI SET signal. In this case, if the value of the resistors R43, R44, R45 are established to operate the transistor Q5 according to the OLCI SET signal, the voltage VCE between the collector and the emitter of the transistor Q5 equals approximately zero. Therefore, the transistor Q4 turns off and the capacitors C4, C37 of the integrator 740 can charge the overload voltage. On the other hand, when overload is detected in the OLCI 700, the display panel 800 indicates overload detection. When a current enters in the display panel 800 indicating an overload or some other fault, the voltage level of the OLCI RESET signal is greater than that of the OLCI SET signal. Therefore, the transistor Q5 turns off and the transistor Q4 turns on via the OLCI RESET signal. So, the charged voltage in the capacitors C4, C37 is discharged through the transistor Q4.

Figure 9:
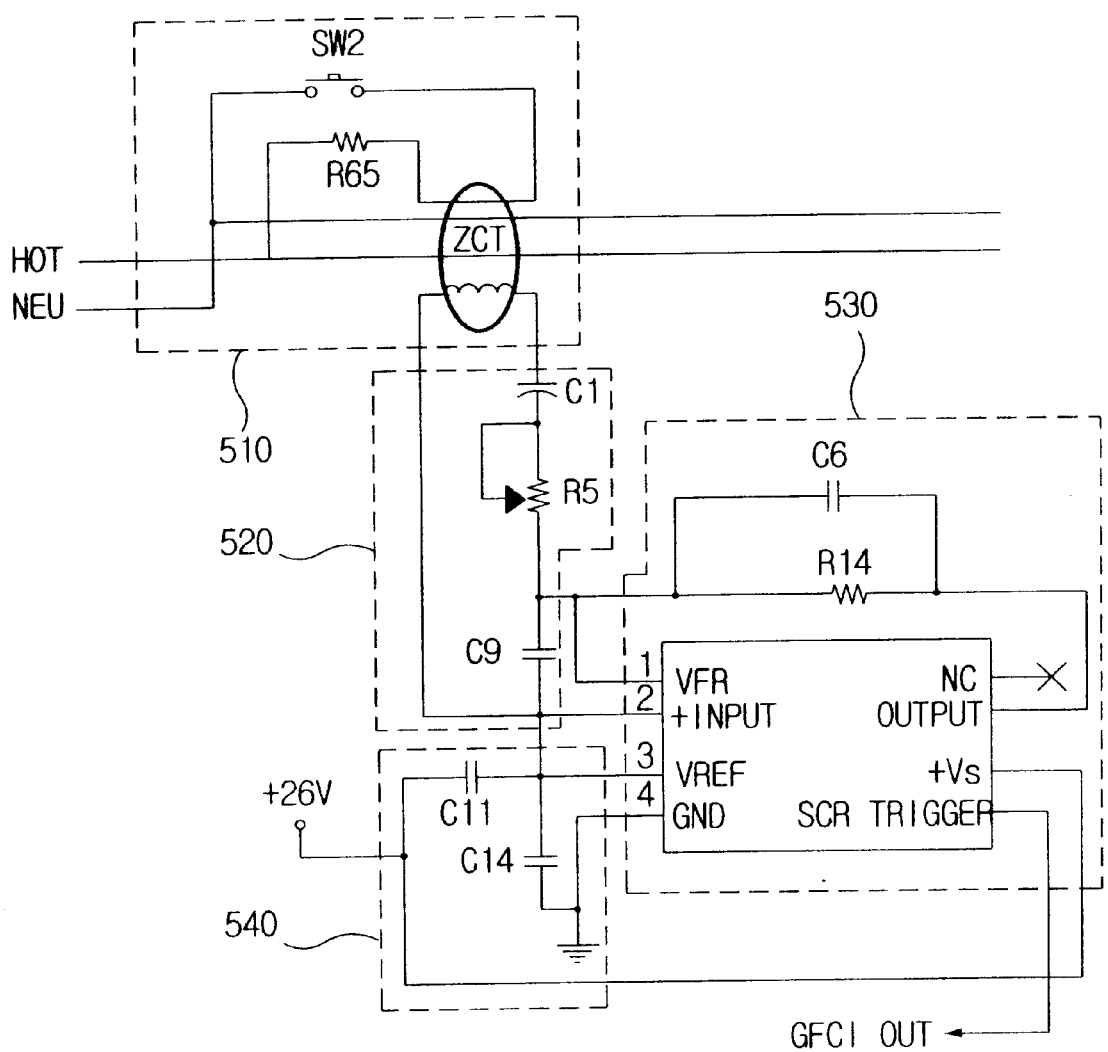
FIG. 9 is a schematic diagram illustrating the GFCI of the present invention.

A schematic diagram illustrating the GFCI of the present invention in more detail is shown in FIG. 9. The GFCI 500 includes a zero current transformer (ZCT) 510 for comparing inflow current with outflow current, a filter 520 for limiting the level of output voltage from the zero current transformer 510, a comparator 530 and a reference voltage generator 540 for providing reference voltage to the comparator 530. The zero current transformer 510 generates a high-level output signal when the inflow current is different than the outflow current, as would be the case if a current leakage occurred. If a current leakage is detected, the output voltage of the zero current transformer 510 is provided to the filter 520. The comparator 530 determines a ground fault by comparing the output signal of the filter 520 with the reference voltage from the reference voltage generator 540. If the filtered output voltage exceeds the reference voltage, the comparator 530 provides the ground fault trip signal GFCI OUT to the trip mechanism 400 and the display panel 800. The zero current transformer 510 detects a current leakage between the phase wire HOT and the neutral wire NEU in an AC electrical line. A test switch SW2 can be included for testing the operation of the GFCI 500. The zero current transformer 510 generates a ground fault voltage when inflow current from line to load is different than outflow current from load to line. The ground voltage of the zero current transformer 510 enters into the filter 520. The filter 520 includes capacitors C1, C9 and a resistor R5 connected in series to one side of the zero current transformer 510. The filter 520 limits the ground fault voltage to the specified level and provides the limited ground fault voltage to the comparator 530, which may comprise a low-level ground fault circuit interrupter such as RV4145. The comparator 530 receives the reference voltage from the reference voltage generator 540, which comprises capacitors C11, C14 coupled between the +26V power voltage and ground. Also, the capacitors C11, C14 diminish noise from the ground fault voltage. A resistor R14 and a capacitor C6 may be connected in parallel between a first output terminal pin 7 and a second input terminal VFR in the comparator 530 for feeding back the first output voltage.

A schematic diagram illustrating the trip mechanism of the present invention in more detail is shown in FIG. 10. In order to interrupt the circuit breaker when an arc fault, ground fault or overload is detected, the trip mechanism 400 includes a line interrupter 410 for tripping the circuit breaker, a trip controller 430 for controlling the line interrupter 410 according to the trip signals (AFCI OUT, GFCI OUT, OLCI OUT), a rectifier 440, a flatter 460 and a trip signal transmitter 470. Also, the trip mechanism 400 may further include a pressure controller 450 and a display power supply 420 for providing power to the display panel 800. The line interrupter 410 includes a trip switch SW0, a metal M1, which has a variable resistance due to the current on the phase wire HOT, a solenoid S1 for controlling operation of the trip switch SW0, a varistor MOV and a capacitor C35. The metal M1 coupled to the phase wire HOT may be made of resistant metal or may be a bimetal. A solenoid may be inserted between the trip controller 430 and the flatter 460. The varistor MOV and the capacitor C35 are coupled in parallel between a node 1 and a node 2 of the rectifier 440. If a bimetal is used as the metal M1, the varistor MOV and the capacitor C35 may be operated for detecting an overload. The display power supply 420 includes a diode D1 and a resistor R7 coupled in series between the phase wire HOT and the display panel 800. The trip controller 430 includes a silicon controlled rectifier SCR1 coupled to a node 2 of the solenoid S1, and a capacitor C7 in parallel with a resistor R12 that are inserted between the control terminal of the silicon controlled rectifier SCR1 and ground. Trip signals caused by an arc fault, ground fault or overload are provided to the control terminal of the silicon controlled rectifier SCR1 through the trip signal transmitter 470. Therefore, if an arc fault, ground fault or overload occurs, current flows to the solenoid S1 through the silicon controlled rectifier SCR1 and the trip switch SW0 is opened by a magnetic field caused by the current in the solenoid S1. The capacitor C7 and the resistor R12 prevent an erroneous operation of the silicon controlled rectifier SCR1. The rectifier 440 includes plurality of diodes D31, D32, D33, D34. The anodes of the diodes D32, D34 are coupled to ground and cathodes of the diodes D31, D33 are coupled to a node 1 of the solenoid S1. The cathode of the diode D32 is coupled to the anode of the diode D31 together with the neutral wire NEU. The cathode of the diode D34 is coupled to the anode of the diode D33 and is also coupled to the capacitor C35 and the pressure controller 450. The rectifier 440 rectifies AC voltage on the AC line and provides rectified current to the flatter 460. The flatter 460 includes a plurality of parallel resistors R48, R49, R50, R51 coupled to node 4 of the rectifier 440 and node 1 of the solenoid S1, a zener diode D12, a resistor R16 and capacitors C12, C13. The zener diode D12, which has an anode coupled to ground, is parallel with the capacitor C12 between the parallel resistors R48, R49, R50, R51 and ground. The resistor R16 is coupled between the cathode of the zener diode D12 and a power voltage of +26V. The capacitor C13 is laid between the +26V power voltage and ground. Therefore, if the AFCI 600 detects an arc fault, the GFCI 500 detects a ground fault or the OLCI 700 detects an overload, the SCR1 is activated by the trip signal AFCI OUT, GFCI OUT or OLCI OUT. Also, the trip switch SW0 interrupts power of the circuit breaker when it is triggered by current from the solenoid S1 that comes through the silicon controlled rectifier SCR1. Thus, the circuit breaker is interrupted.

In the United States, there are various regulations controlling the triggering of a circuit breaker. For example, a circuit breaker must be triggered within 1 hour in the case of 135% current, and 4 minutes in the case of 200% current over rated current for AC 120 volts, 15 or 20 A. This regulation may vary according to country. However, by controlling the operating point of the silicon controlled rectifier SCR1, various standards can be met.

Also, the trip mechanism 400 may include a pressure controller 450 for regulating inner pressure resulting from an arc fault, ground fault or overload. The pressure controller 450, which couples between node 1 of the rectifier 440 and the varistor MOV, includes a switch for interlocking to the metal M1. If the circuit breaker is uninterrupted, node 1 and node 2 of the pressure controller 450 are connected. On the other hand, if the circuit breaker is interrupted by an arc fault, ground fault or overload, node 1 and node 3 are connected. Thus, the phase wire HOT is isolated from the trip controller 430, so that the circuit breaker is not susceptible to inner pressure. Further, a display panel 800 is needed so that an arc fault, ground fault or overload is brought to the attention of responsible personnel.

A schematic diagram illustrating display panel 800 of the present invention is shown in FIG. 11. The display panel 800 includes a display element 830 for indicating an arc fault, ground fault or overload, a display controller 810 for controlling the operation of the display element 830 and a power controller 820, which provides the display power DISPLAY PWR from the display power supply 420. The display element 830 includes a resistor R23 coupled to the trip mechanism 400. It also includes an arc fault display element 832 for indicating an arc fault, a ground fault display element 834 for indicating a ground fault or an overload display element 836 for indicating an overload, each coupled in parallel between the resistor R23 and ground. The arc fault display element 832 includes a light emitting diode LED1 connected in series, a silicon controlled rectifier SCR2 between the resistor R23 and ground, and a capacitor C27 and resistor R36 coupled between the gate of the SCR2 and ground. The resistor R36 and the capacitor C27 prevent an erroneous operation of the SCR2. Also, the ground fault display element 834 comprises a light emitting diode LED2, a silicon controlled rectifier SCR3 between the resistor R23 and ground, a capacitor C28 and a resistor R37 coupled to the gate of the silicon controlled rectifier SCR3. Similarly, the overload display element 836 comprises a serially connected light emitting diode LED3, a silicon controlled rectifier SCR4, a capacitor C29 and a resistor R38 between the gate of the SCR 4 and ground. The display controller 810 includes serially connected resistor R52 and capacitor C25 coupled to a power voltage of +26V The display controller 810 also includes a transistor Q3 for controlling the on/off function of the light emitting diodes LED1, LED2, LED3. The base of the transistor Q3 is connected to the capacitor C25, the collector is connected to the anodes of the light emitting diodes LED1, LED2, LED3 and the emitter is connected to ground. Therefore, if a reset signal LED RESET (+26V) is provided to the display element 830 when the display element 830 turns on due to an arc fault, ground fault or overload, the display panel 800 will be initialized by an interruption of current through the display elements 832, 834, 836. This is caused by a turn-on of the transistor Q3. Also, an OLCI RESET signal and OLCI SET signal are provided to the discharge controller 780 from both ends of the resistor R23. The power controller 820 includes a capacitor C23 coupled in parallel to a zener diode D10, which provides the voltage within a certain range to the light emitting diodes in the display element 830. Also, the display panel 800 may include a delay circuit 840, which receives trip signals AFCI OUT, GFCI OUT and OLCI OUT. The delay circuit 840 includes a plurality of resistors R35, R39, R41, diodes D20, D21, D22 and capacitors C30, C31, C32. The capacitor C31 is laid between the AFCI OUT signal node and ground, the capacitor C32 between the node of the GFCI OUT node and ground, and the capacitor C30 between the OLCI OUT node and ground. The resistor R41 is connected to the diode D22 in series between the gate of the silicon controlled rectifier SCR2 of the arc fault display element 832 and the AFCI OUT signal node. Similarly, the resistor R39 is connected to the diode D21 in series between gate of the SCR3 and the AFCI OUT node and the resistor R35 is connected to the diode D20 in series between the gate of the SCR4 and the OLCI OUT node. Each of capacitors C30, C31, C32 delays the trip signals AFCI OUT, GFCI OUT, OLCI OUT, so that erroneous operation of the display element 830 is diminished.

In conclusion, if an arc fault occurs in the circuit breaker, the AFCI OUT signal of the AFCI 600 turns on the SCR2 in the arc fault display element 832, and the light emitting diode LED1 displays the occurrence of the arc fault to the outside. Similarly, if a ground fault or overload occurs in the circuit breaker, the trip signal GFCI OUT or OLCI OUT turns on the SCR3 or SCR4 respectively, and the light emitting diode LED2 or LED3 displays the occurrence of the ground fault or overload to the outside. If a manager supplies power voltage to the circuit breaker interrupted by arc fault, ground fault or overload, the display panel 830 turns off as a function of the transistor Q3.

As described above, the AFCI of the present invention can detect an arc fault more effectively. This can help prevent fires caused by arc faults. Also, the AFCI can control the trip level at which the circuit breaker is triggered by an arc fault. Also, the AFCI and OLCI of the present invention can prevent erroneous operation of the circuit breaker caused by a dimmer. Also, the trip mechanism of the present invention can endure inner pressure because of the inclusion of a pressure controller. As discussed previously, the AFCI can be used as a stand-alone arcing fault detector or combined with other types of circuit interrupting devices. Therefore, the circuit breaker can be installed easily in a commercial or residential building because of its small size. Also, the circuit breaker of the present invention includes display elements for indicating an arc fault, ground fault or overload respectively. Thus, responsible personnel can be aware of faults quickly and easily. Also, after the interrupting processes of the circuit breaker and display panel are activated, initialization processes of the circuit breaker and the display panel are achieved simultaneously according to a power supply.

While the present invention has been particularly shown and described with reference to preferred embodiments thereof, it will be appreciated that many variations, modifications and other applications of the present invention may be made.

What is claimed is:

1. An overload circuit interrupter (OLCI) for use in an electrical wiring system that can shut off an AC (Alternating Current) source from a phase conductor and a neutral conductor when an overload occurs in the AC source, the OLCI comprising:

a current transformer for producing an overload voltage in accordance with current variations in the phase conductor and the neutral conductor;

a rectifier for half-wave or full-wave rectifying the overload voltage;

a level controller for limiting the rectified overload voltage to a specified level;

an integrator for charging the limited overload voltage from the level controller and providing an overload indicative signal;

a comparator for comparing the overload indicative signal with a reference overload voltage and producing an overload trip signal that shuts the AC source off from the phase conductor and the neutral conductor; and a reference voltage generator for generating the reference overload voltage.

2. An overload circuit interrupter (OLCI) for use in an electrical wiring system that can shut off an AC (Alternating Current) source from a phase conductor and a neutral conductor when an overload occurs in the AC source, the OLCI comprising:

a current transformer for producing an overload voltage in accordance with current variations in the phase conductor and the neutral conductor;

a rectifier for half-wave or full-wave rectifying the overload voltage;

a level controller for limiting the rectified overload voltage to a specified level;

an integrator for charging the limited overload voltage from the level controller and providing an overload indicative signal;

a comparator for comparing the overload indicative signal with a reference overload voltage and producing an overload trip signal that shuts the AC source off from the phase conductor and the neutral conductor; and a bias generator for generating a bias to be received by the comparator together with the overload indicative signal.

3. An overload circuit interrupter (OLCI) for use in an electrical wiring system that can shut off an AC (Alternating Current) source from a phase conductor and a neutral conductor when an overload occurs in the AC source, the OLCI comprising:

a current transformer for producing an overload voltage in accordance with current variations in the phase conductor and the neutral conductor;

a rectifier for half-wave or full-wave rectifying the overload voltage;

a level controller for limiting the rectified overload voltage to a specified level;

an integrator for charging the limited overload voltage from the level controller and providing an overload indicative signal;

a comparator for comparing the overload indicative signal with a reference overload voltage and producing an overload trip signal that shuts the AC source off from the phase conductor and the neutral conductor; and a discharge controller for discharging voltage of said integrator when the AC source shuts off.

4. A circuit breaker in an electrical wiring system that can shut an AC source off from a phase conductor and a neutral conductor when an overload occurs in the AC source, said circuit breaker comprising:

an overload circuit interrupter (OLCI) coupled to the phase conductor and the neutral conductor for detecting an overload and producing an overload trip signal, the OLCI comprising a current transformer for producing an overload voltage in accordance with current variations in the phase conductor and the neutral conductor, a rectifier for half-wave or full-wave rectifying the overload voltage, a level controller for limiting the rectified overload voltage to a specified level, an integrator for charging the limited overload voltage from the level controller and for providing overload indicative signal, and a comparator for comparing the overload indicative signal with a reference overload voltage and for producing an overload trip signal, which shuts the AC source off from the phase conductor and the neutral conductor;

a display circuitry for indicating the overload corresponding with the overload trip signal; and a trip circuitry coupled to the phase conductor and the neutral conductor, for shutting the AC source off from the phase conductor and the neutral conductor corresponding with the overload trip signal.

5. An arc fault circuit interrupter (AFCI) in an electrical wiring system that can shut an AC (Alternating Current) source off from a phase conductor and a neutral conductor when an arc fault occurs in the AC source, said AFCI comprising:

a first current transformer for producing an arc fault voltage in accordance with the variation of current in the phase conductor and in the neutral conductor;

a rectifier for half-wave or full-wave rectifying the arc fault voltage;

a first buffer for delaying the rectified arc fault voltage;

a first comparator for comparing the rectified arc fault voltage with a first reference voltage and producing an arc fault indicative signal;

an integrator for charging the arc fault indicative signal from the first comparator; and a second comparator for comparing the arc fault indicative signal with a second reference voltage and producing an arc fault trip signal.

6. A circuit breaker in an electrical wiring system that can shut an AC source off from a phase conductor and a neutral conductor when an overload occurs in the AC source, said circuit breaker comprising:

an arc fault circuit interrupter (AFCI) coupled to the phase conductor and the neutral conductor for detecting an arc fault and producing an arc fault trip signal, the AFCI comprising a first current transformer for producing an arc fault voltage in accordance with the variation of current in the phase conductor and in the neutral conductor, a rectifier for half-wave or full-wave rectifying the arc fault voltage, a first buffer for delaying the rectified arc fault voltage, a first comparator for comparing the rectified arc fault voltage with a first reference voltage and producing an arc fault indicative signal, an integrator for charging the arc fault indicative signal from the first comparator, and a second comparator for comparing the arc fault indicative signal with a second reference voltage and producing an arc fault trip signal;

a display circuitry for indicating the arc fault corresponding with the arc fault trip signal; and a trip circuitry coupled to the phase conductor and the neutral conductor, for shutting the AC source off from the phase conductor and the neutral conductor corresponding with the arc fault trip signal.

7. A circuit breaker in an electrical wiring system that can shut an AC source off from a phase conductor and a neutral conductor when an overload occurs in the AC source, said circuit breaker comprising:

an arc fault circuit interrupter (AFCI) coupled to the phase conductor and the neutral conductor for detecting an arc fault and producing an arc fault trip signal, the AFCI comprising a first current transformer for producing an arc fault voltage in accordance with the variation of current in the phase conductor and in the neutral conductor, a rectifier for half-wave or full-wave rectifying the arc fault voltage;

a first buffer for delaying the rectified arc fault voltage, a first comparator for comparing the rectified arc fault voltage with a first reference voltage and producing an arc fault indicative signal, an integrator for charging the arc fault indicative signal from the first comparator, and a second comparator for comparing the arc fault indicative signal with a second reference voltage and producing an arc fault trip signal;

an overload circuit interrupter (OLCI) coupled to the phase conductor and the neutral conductor for detecting an overload and producing an overload trip signal, the OLCI comprising a current transformer for producing an overload voltage in accordance with the current variations in the phase conductor and in the neutral conductor, a rectifier for half-wave of full-wave rectifying he overload voltage;

a level controller for limiting the rectified overload voltage to a specified level, an integrator for charging the limited overload voltage from the level controller and for providing an overload indicative signal, and a comparator for comparing the overload indicative signal with a reference overload voltage and producing an overload trip signal, which shuts the AC source off from the phase conductor and the neutral conductor;

a display circuitry for indicating the arc fault or overload corresponding with the arc fault trip signal or overload trip signal; and a trip circuitry coupled to the phase conductor and the neutral conductor, for shutting the AC source off from the phase conductor and the neutral conductor corresponding with the arc fault trip signal or overload trip signal.

8. A circuit breaker in an electrical wiring system that can shut an AC source off from a phase conductor and a neutral conductor when an overload occurs in the AC source, said circuit breaker comprising:

an arc fault circuit interrupter (AFCI) coupled to the phase conductor and the neutral conductor for detecting an arc fault and producing an arc fault trip signal, the AFCI comprising a first current transformer for producing an arc fault voltage in accordance with the variation of current in the phase conductor and in the neutral conductor, a rectifier for half-wave or full-wave rectifying the arc fault voltage, a first buffer for delaying the rectified arc fault voltage, a first comparator for comparing the rectified arc fault voltage with a first reference voltage and producing an arc fault indicative signal, an integrator for charging the arc fault indicative signal from the first comparator, and a second comparator for comparing the arc fault indicative signal with a second reference voltage and producing an arc fault trip signal;

an overload circuit interrupter (OLCI) coupled to the phase conductor and the neutral conductor for detecting an overload and producing an overload trip signal, the OLCI comprising a current transformer for producing an overload voltage in accordance with current variations in the phase conductor and in the neutral conductor, a rectifier for half-wave of full-wave rectifying the overload voltage, a level controller for limiting the rectified overload voltage to a specified level, an integrator for charging the limited overload voltage from the level controller and for providing an overload indicative signal, and a comparator for comparing the overload indicative signal with a reference overload voltage and producing an overload trip signal, which shuts the AC source off from the phase conductor and the neutral conductor;

a ground fault circuit interrupter (GFCI) coupled to the phase conductor and the neutral conductor for detecting a ground fault and producing a ground fault trip signal;

a display circuitry for indicating the arc fault, ground fault or overload corresponding with at least one signal selected from the group consisting of the arc fault trip signal, the ground fault trip signal and the overload trip signal; and a trip circuitry coupled to the phase conductor and the neutral conductor, for shutting the AC source off from the phase conductor and the neutral conductor corresponding with the at least one signal selected from the group consisting of the arc fault trip signal, the ground fault trip signal and overload trip signal.

* * * * *